US011297803B2

(12) United States Patent
Martoni

(10) Patent No.: US 11,297,803 B2
(45) Date of Patent: Apr. 12, 2022

(54) CONVEYING SYSTEM FOR SHOCK-SENSITIVE ITEMS, IN PARTICULAR EGGS

(71) Applicant: VALLI S.P.A., Galeata (IT)

(72) Inventor: Fausto Martoni, Galeata (IT)

(73) Assignee: VALLI S.P.A., Galeata (IT)

( * ) Notice: Subject to any disclaimer, the term of this patent is extended or adjusted under 35 U.S.C. 154(b) by 5 days.

(21) Appl. No.: 16/941,702

(22) Filed: Jul. 29, 2020

(65) Prior Publication Data

US 2021/0029972 A1 Feb. 4, 2021

(30) Foreign Application Priority Data

Jul. 30, 2019 (IT) .................. 102019000013368

(51) Int. Cl.
| | |
|---|---|
| *A01K 31/16* | (2006.01) |
| *B65G 23/24* | (2006.01) |
| *B65G 23/30* | (2006.01) |
| *B65G 37/00* | (2006.01) |
| *B65G 47/57* | (2006.01) |
| *B65G 23/06* | (2006.01) |

(52) U.S. Cl.
CPC ............ *A01K 31/165* (2013.01); *B65G 23/06* (2013.01); *B65G 23/24* (2013.01); *B65G 23/30* (2013.01); *B65G 37/00* (2013.01); *B65G 47/57* (2013.01); *B65G 2201/0208* (2013.01); *B65G 2203/0291* (2013.01); *B65G 2812/011* (2013.01)

(58) Field of Classification Search
CPC .... A01K 31/165; B65G 17/126; B65G 17/36; B65G 23/06; B65G 23/24; B65G 23/28; B65G 23/30; B65G 37/00; B65G 47/57; B65G 49/05; B65G 2201/0208; B65G 2203/0291; B65G 2812/011
See application file for complete search history.

(56) References Cited

U.S. PATENT DOCUMENTS

| | | | |
|---|---|---|---|
| 3,626,905 A | 12/1971 | Giesbert et al. | |
| 3,672,485 A * | 6/1972 | Walters | A01K 31/165 198/450 |
| 3,789,802 A * | 2/1974 | Conley | A01K 31/165 119/337 |
| 4,036,355 A * | 7/1977 | Valli | A01K 31/165 198/607 |

(Continued)

FOREIGN PATENT DOCUMENTS

| | | |
|---|---|---|
| KR | 20150114171 A | 10/2015 |
| NL | 8002232 A | 11/1981 |
| WO | 2019/048949 A1 | 3/2019 |

OTHER PUBLICATIONS

Italian Search Report and Written Opinion dated Mar. 19, 2020 for corresponding Italian Patent Application No. 102019000013368.

*Primary Examiner* — Gene O Crawford
*Assistant Examiner* — Keith R Campbell
(74) *Attorney, Agent, or Firm* — Howson & Howson LLP

(57) ABSTRACT

A conveying system for shock-sensitive items, in particular eggs, is provided and comprises a plurality of conveying devices in which items are transferred from one conveying device to another. In particular, the conveying system comprises a motion transmission assembly which ensures synchronism between the advancement of a first conveying device and the advancement of a second conveying device.

8 Claims, 3 Drawing Sheets

(56) References Cited

U.S. PATENT DOCUMENTS

| | | | |
|---|---|---|---|
| 4,218,932 A | | 8/1980 | McComber |
| 4,293,066 A | | 10/1981 | Kennedy et al. |
| 5,279,254 A | | 1/1994 | Dowty |
| 5,848,947 A | * | 12/1998 | Fornasiere .............. F16H 55/30 |
| | | | 474/96 |
| 8,127,916 B2 | * | 3/2012 | Mix ....................... B65G 17/36 |
| | | | 198/801 |
| 2021/0059221 A1 | * | 3/2021 | Martoni ................ B65G 23/24 |

* cited by examiner

CONVEYING SYSTEM FOR SHOCK-SENSITIVE ITEMS, IN PARTICULAR EGGS

BACKGROUND

The present invention relates to a conveying system for shock-sensitive items, in particular eggs.

In detail, the present invention refers to a conveying system for shock-sensitive items, in particular eggs, which comprises a plurality of conveying devices and in which the items are transferred from one conveying device to another one.

Poultry facilities for laying hens are known inside which hens are housed in cages arranged in parallel rows and stacked on top of each other on a plurality of levels. The eggs laid by the hens are taken from the laying nests provided in the cages and conveyed to one end of the rows of cages by means of longitudinal conveyor belts extending along the rows of cages on each level.

From the longitudinal conveyor belts, eggs are transferred to a transfer device which comprises a conveyor belt on which a plurality of individual seats are secured and arranged aligned to one another, each seat being suitable for receiving a respective egg. The conveyor belt is designed so as to comprise an upwardly moving section and a downwardly moving section, connected to each other by a deflection element. The eggs coming from the longitudinal conveyor belts arranged along the rows of cages are transferred to the conveyor belt of the transfer device at its upwardly moving section (each egg being received in a corresponding individual seat) and are carried upwards, up to the deflection element; subsequently, the eggs—always contained in their respective individual seats—advance along the downwardly moving section of the conveyor belt of the transfer device, and from there they are further transferred to a transverse conveying line that carries the eggs to the subsequent treatment steps to which they have to be subjected for their packaging.

A conveying system of the type illustrated above is disclosed for example in documents FR 2030824 and NL8002232.

A similar conveying system is also shown in international patent application WO 2019/048949 in the name of the Applicant.

It is evident that eggs—due to their fragile nature—are likely to be damaged while being conveyed from the laying nests to the transverse conveying line which takes them out to the subsequent treatment steps to which they have to be subjected for their packaging.

In order to reduce or suppress the risk of damaging eggs when transferring them from the longitudinal conveyor belts arranged along the rows of cages to the seats of the transfer device, WO 2019/048949 discloses a conveying system in which the forward movement of the longitudinal conveyor belts is a movement at variable speed, namely an alternately accelerated and decelerated movement, so that eggs carried by the longitudinal conveyor belts are transferred to the seats of the transfer device when the forward speed of the longitudinal conveyor belts is at its minimum, thus minimizing the risk of shocks and consequent damages to the transferred eggs.

In order for the solution described in WO 2019/048949 to be implemented effectively, it is necessary that the forward movement of the longitudinal conveyor belts and the movement of the transfer device are correctly synchronized to each other.

The main object of the present invention is therefore to provide a conveying system for eggs (and more generally for shock-sensitive items) suitable for guaranteeing that eggs (and more generally shock-sensitive items) are transferred from a conveying device oriented in a substantially horizontal direction to an adjacent conveying device oriented in a substantially vertical direction wherein the conveying devices advance in a synchronized manner, so as to ensure that the transfer takes place in the smoothest possible way and without risk of damages.

This and other objects are achieved by the conveying system as claimed in the appended claims.

SUMMARY

The conveying system according to the invention comprises a first conveying device or conveying device with a substantially horizontal orientation and a second conveying device or conveying device with a substantially vertical orientation, which conveying devices are arranged adjacent to each other so that items can be transferred from the first conveying device to the second conveying device.

In order to synchronize the movement of the conveying devices and optimize the transfer of items, the conveying system according to the invention is equipped with a motion transmission assembly arranged between the first and the second conveying devices and comprising:
  a first shaft or driving shaft, which receives motion from one of the conveying devices;
  a second shaft or driven shaft, mounted on the other one of the conveying devices;
  a first pinion mounted on the first shaft or driving shaft;
  a second pinion mounted on the second shaft or driven shaft;
  a transmission chain mounted between the first pinion and the second pinion, so as to transfer motion from the driving shaft to the driven shaft and, consequently, from the one of the conveying devices to the other one of the conveying devices;
  wherein:
  the first shaft or driving shaft has a polygonal cross-section;
  the second shaft or driven shaft has a polygonal cross-section, having a number of sides equal to the number of sides of the polygonal cross-section of the first shaft or driving shaft;
  the first pinion has a number of teeth equal to the number of sides of the polygonal cross-section of the first shaft or driving shaft;
  the second pinion has a number of teeth equal to the number of teeth of the first pinion or to a multiple thereof.

Thanks to the geometry of the motion transmission assembly described above, synchronization of the first and second conveying devices can be effectively guaranteed.

This synchronization is guaranteed regardless of the orientation of the pinions during installation.

In a preferred embodiment of the invention, the motion is transmitted from the second conveying device to the first conveying device. Correspondingly, the first shaft or driving shaft receives motion from the second conveying device and transfers it to the second shaft or driven shaft which is mounted on the first conveying device.

In a particularly preferred embodiment of the invention, the motion transmission assembly comprises a motion transmission element which is configured so as to transform a motion at constant speed of the second conveying device into an alternately accelerated and decelerated motion of the first conveying device.

The motion transmission element preferably consists of a cam wheel, mounted on the driving shaft and comprising a number of arms equal to the number of sides of the polygonal cross-section of the driving shaft. Thanks to the presence of the cam profiles of the cam wheel, the motion at constant speed of the second conveying device transmitted to the cam wheel is transformed by this cam wheel into an alternately accelerated and decelerated motion which is transmitted to the first conveying device.

In a preferred embodiment of the invention, the second conveying device carries a plurality of seats for the items to be transported, and items are transferred from the first conveying device to a corresponding seat of the second conveying device.

According to this embodiment:
  if the number of teeth of the second pinion is equal to the number of teeth of the first pinion, the transfer of the items takes place in all the seat consecutively arranged on the second conveying device;
  if the number of teeth of the second pinion is equal to twice the number of teeth of the second pinion, the transfer of the articles takes place in alternate seats.

In a preferred and non-limiting embodiment of the invention:
  the first shaft or driving shaft has a square cross-section;
  the second shaft or driven shaft has a square cross-section;
  the first pinion has four teeth;
  the second pinion has four teeth or eight teeth.

BRIEF DESCRIPTION OF THE DRAWINGS

Further features and advantages will become clearer from the following detailed description of a preferred embodiment of the invention, given by way of non-limiting example, with reference to the attached drawings in which.

DETAILED DESCRIPTION

In the following, a preferred embodiment of the invention will be described with reference to transport of eggs. However, this embodiment should not be understood in a limiting way and the invention can also be applied to transport of other similar shock-sensitive items.

Figure 1:
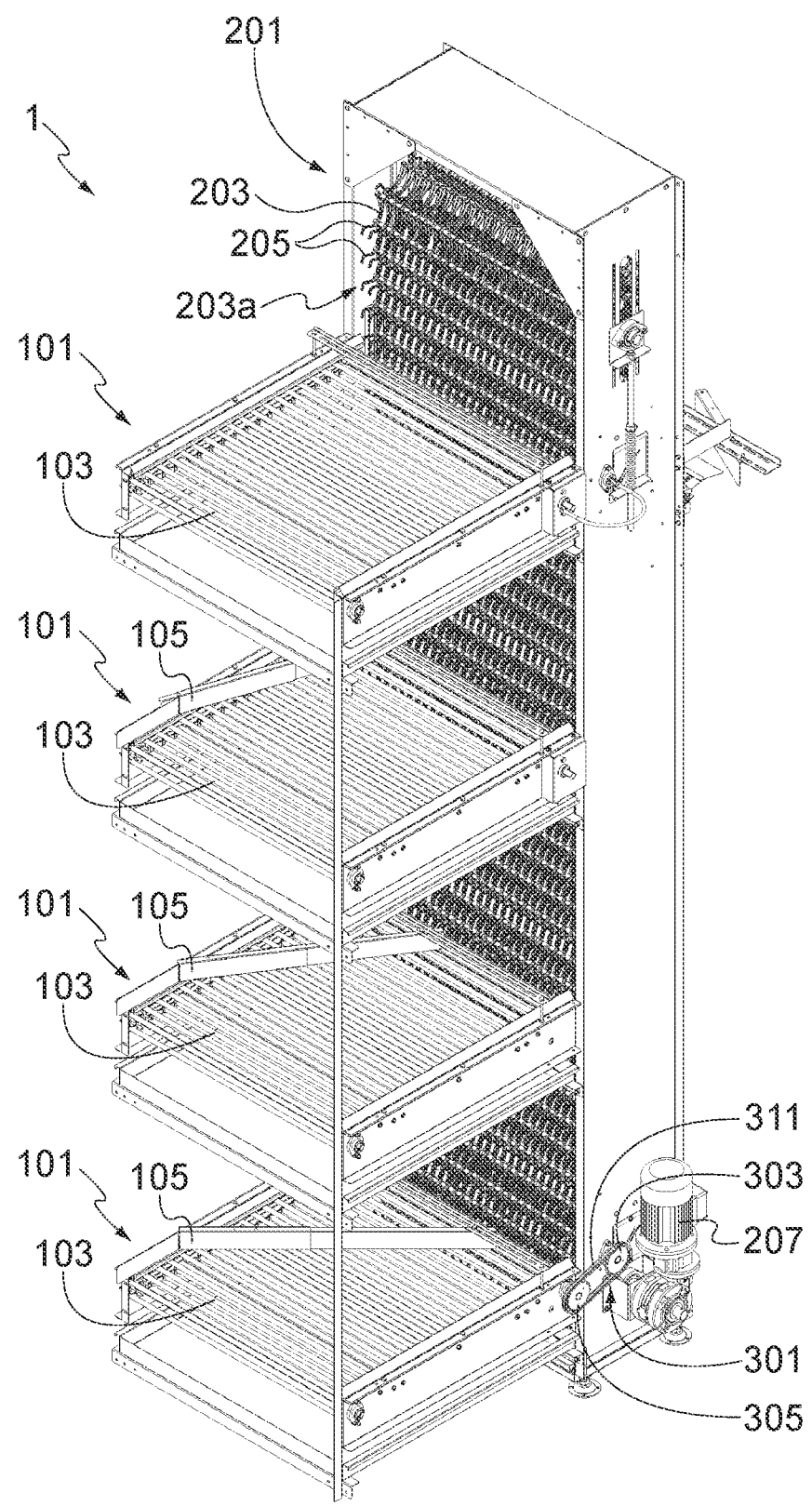
FIG. 1 is a schematic perspective view of the conveying system according to the invention.

With reference to FIG. 1, a conveying system for eggs 1 is schematically shown.

The conveying system comprises a plurality of first conveying devices 101. Each of the first conveying devices 101 has a substantially horizontal orientation, i.e. an orientation parallel to the ground and to the supporting surface on which the conveying system 1 rests, and comprises one or more conveyor belts 103.

The conveying devices 101 can be arranged parallel and aligned to one another, at different heights from the ground, which substantially correspond to the heights of different rows of cages receiving the laying hens.

The conveyor belt 103 of each first conveying device 101 is adapted to receive eggs from a corresponding longitudinal conveyor belt (not shown in FIG. 1) arranged along a corresponding row of cages. In other words, a first end or proximal end of the conveyor belt 103 is arranged adjacent to and facing the end of the corresponding longitudinal conveyor belt, so that laid eggs transferred from the nesting nests to a longitudinal conveyor belt are further transferred from the longitudinal conveyor belt to the conveyor belt 103 of the first conveying device 101.

In general, the longitudinal conveyor belts arranged along the cages have a width slightly larger than the width of the eggs to be transported, while the conveyor belt 103 of the first conveying device 101 has a width considerably larger than the width of the eggs to be transported, for the reasons that will be clarified below.

Furthermore, in general the conveyor belt 103 of the first conveying device 101 is made in the form of a bar conveyor belt.

The conveying system 1 further comprises a second conveying device 201 which comprises one or more conveyor belts 203 and which has a first section 203a oriented in a substantially vertical direction, i.e. perpendicular to the ground and to the supporting surface on which the conveying system 1 rests, along which the conveyor belt advances in an upwards direction (upwardly moving section 203a); the second conveying device 201 further comprises a second section 203b oriented in a substantially vertical direction and along which the conveyor belt 203 advances in a downwards direction (downwardly moving section 203b). The conveyor belt 203 of the second conveying device 201 preferably has a width substantially equal to the width of the conveyor belt 103 of the first conveying device 101.

The conveyor belt 203 of the second conveying device 201 comprises a plurality of rows of seat 205, each row of seats extending in a direction transverse to the longitudinal axis of the conveyor belt 203, preferably over the entire width of the conveyor belt 203. Each seat 205 is sized to receive a single egg.

It should be noted that in the shown embodiment the rows of seats 205, linked to one another, constitute the structure itself of the conveyor belt 203 of the second conveying device 201; however, it is also possible that the conveyor belt has its own structure and the seats are secured to this structure, for example by welding, gluing or the like.

The second conveying device 201 is arranged in such a way that the upwardly moving portion 203a of the conveyor belt 203 is aligned to and facing the second end or distal end of the conveyor belt 103 of the first conveying device 101, so that eggs can be transferred from the conveyor belt 103 of the first conveying device 101 to the seats 205 of the conveyor belt 203 of the second conveying device 201.

It should be noted in this respect that each of the conveying devices 101 shown in the Figure is provided with a baffle 105 arranged on the respective conveyor belt 103 and oriented differently. Thanks to the presence of the baffles 105, eggs coming from the cages of each level will be placed on the conveyor belt 103 of the respective first conveying device 101 in a given position along the width of the conveyor belt 103, different from the positions of eggs coming from the cages of the other levels. Thanks to this arrangement, it is impossible for an egg coming from a cage at a higher level (therefore from a first conveying device 101 at a higher height) to occupy a seat 205 of the second conveying device 201 already occupied by an egg coming from a cage of a lower level (therefore from a first conveying device 101 at a lower height). It is evident that for this purpose the width of the conveyor belts 103 of the first conveying devices 101—and correspondingly the width of the conveyor belt 203 of the second conveying device 201—must be considerably larger than the width of the eggs to be transported, and the higher the number of the first conveying devices 101 is, the larger the width of the conveyor belts of the first and second conveying devices shall be.

Once the eggs are transferred to the seats 205 of the second conveying device 201, they are carried upwards to the top of the upwardly moving section 203a of the conveyor belt 203 and then along a deflection element placed at the top of the upwardly moving section 203a and further along the downwardly moving section 203b of the conveyor belt.

The seats 205 are shaped so as to continuously support the eggs received therein along the upwardly moving section 203a of the conveyor belt 203 of the second conveying device 201, during transfer along the deflection element and along the downwardly moving section 203b of the conveyor belt 203 of the second conveying device 201.

A third conveying device, not shown in FIG. 1, having a substantially horizontal orientation, i.e. parallel to the ground and to the supporting surface on which the conveying system 1 rests, and comprising one or more conveyor belts, is arranged in such a way that the downwardly moving section 203b of the conveyor belt 203 of the second conveying device 201 is aligned to and facing the third conveying device, so that eggs can be transferred from the conveyor belt 203 of the second conveying device 201 to the conveyor belt of the third conveying device.

The third conveying device carries the eggs to the subsequent treatment steps to which they have to be subjected for their packaging.

According to the invention, the conveying system 1 is designed so as to guarantee synchronization between the first conveying device(s) 101 and the second conveying device 201, so as to ensure the correct transfer of eggs from the conveyor belts 103 of the first conveying device(s) to the seats 205 of the second conveying device.

In particular, the conveying system includes a motion transmission assembly for transferring motion from one conveying device to the other one in such a way to ensure synchronization between the conveying devices.

In the shown embodiment, the motion transmission assembly transfers motion from the second conveying device to the first conveying device: only the conveyor belt 203 of the second conveying device 201 is equipped with a driving system (the gearmotor 207 visible in FIG. 1) and the motion is transferred from the conveyor belt 203 of the second conveying device 201 to the conveyor belt 103 of the first conveying device 101 by the motion transmission assembly.

Figure 2:
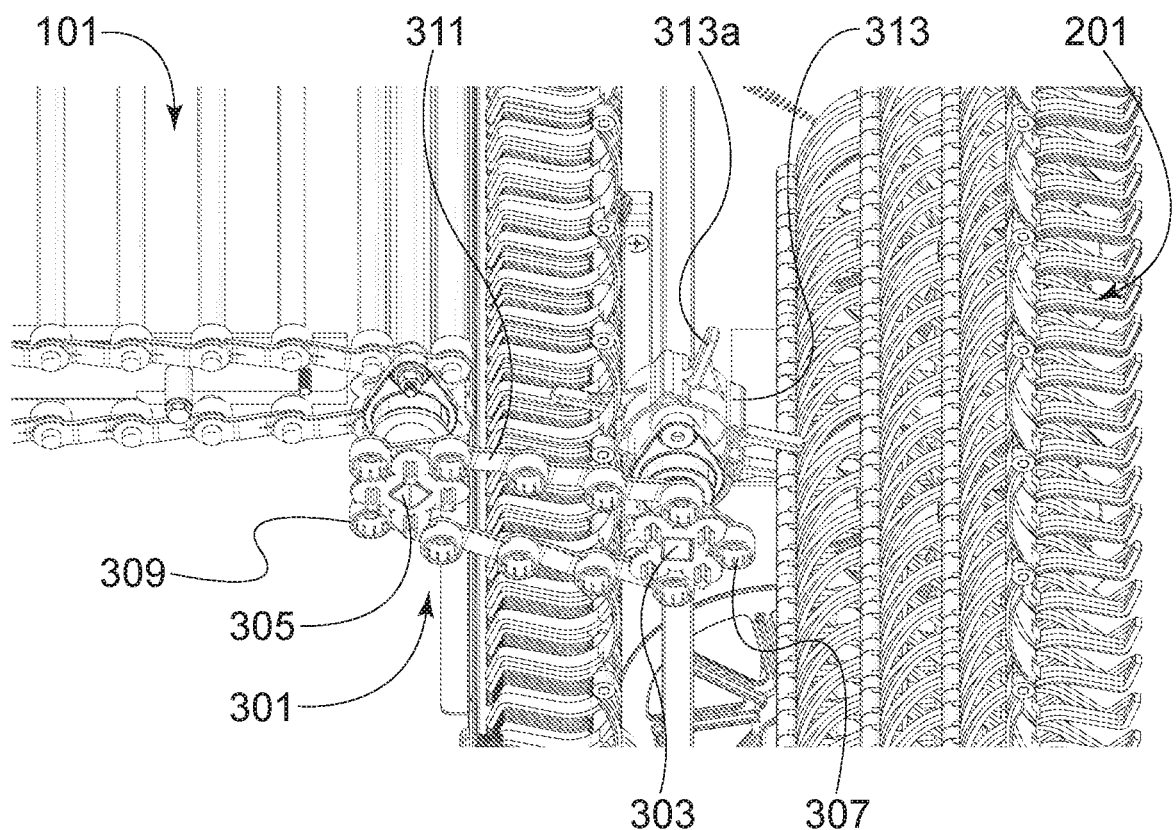
FIGS. 2 and 3 shows in enlarged scale the motion transmission assembly of the conveying system of FIG. 1.
Figure 3:
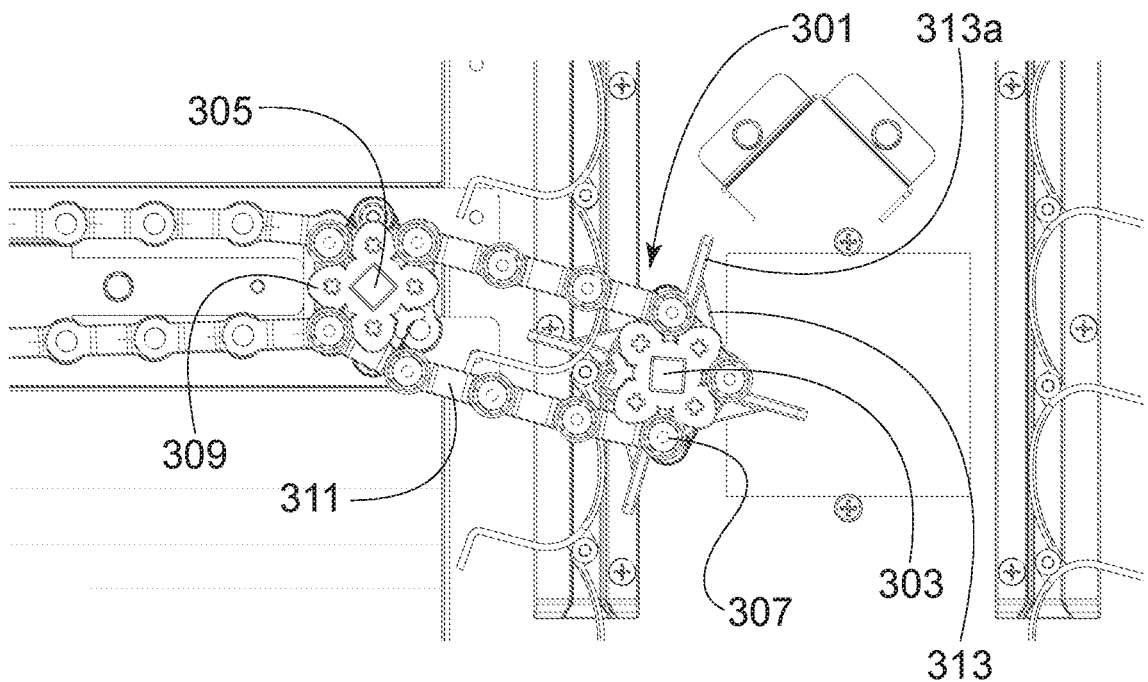

The motion transmission assembly is illustrated in greater detail in FIGS. 2 and 3.

The motion transmission assembly 301 of the conveying system according to the invention includes:
 a first shaft or driving shaft 303, which receives motion from the conveyor belt 203 of the second conveying device 201 and which has a square cross-section;
 a second shaft or driven shaft 305, which is mounted on a return roller of the conveyor belt 103 of the first conveying device and which also has a square cross-section;
 a first pinion 307 mounted on the first shaft 301, which is provided with four teeth;
 a second pinion 309 mounted on the second shaft 305, which also has four teeth;
 a transmission chain 311 mounted between the first pinion 307 and the second pinion 309.

Advantageously, the geometry of the so designed motion transmission assembly 301 ensures synchronization between the first and second conveying devices 101, 201.

It will be evident to the person skilled in the art that the shape of the first and second shafts 303, 305, as well as the number of teeth of the first and second pinions 307, 309, are not to be understood in a limiting way.

The first shaft 303 and the second shaft 305 could have any polygonal cross-section, provided that they are equal to each other.

In any case, the first pinion 307 and the second pinion 309 will have a number of teeth equal to the number of sides of the polygonal cross-section of the first and the second shaft.

In the preferred embodiment of the invention shown in FIGS. 2 and 3, the motion transmission assembly 301 is configured so as to transform the motion at constant speed of the second conveying device 201 into an alternately accelerated and decelerated motion of the first conveying device 101.

This arrangement—combined with the synchronization of the first and second conveying devices 101, 201—allows the eggs to be transferred from the first conveying device to the second conveying device in the smoothest possible way, i.e. when the advancement speed of the first conveying device is at its minimum, so as to avoid shocks that could damage the eggs.

In particular, the motion transmission assembly 301 comprises a cam wheel 313 mounted on the driving shaft 303 and comprising a number of arms 313a equal to the number of sides of the polygonal cross-section of the driving shaft, i.e. four in the shown embodiment.

The arms 313a of the cam wheel 313 engage the seats 205 of the second conveying device 201, and thanks to this engagement the driving shaft 303 receives the motion from the second conveying device.

Thanks to the presence of the cam profiles of the cam wheel 313, the motion at constant speed of the second conveying device 201 is transformed into an alternately accelerated and decelerated motion which is transmitted to the first conveying device 101.

Figure 4:
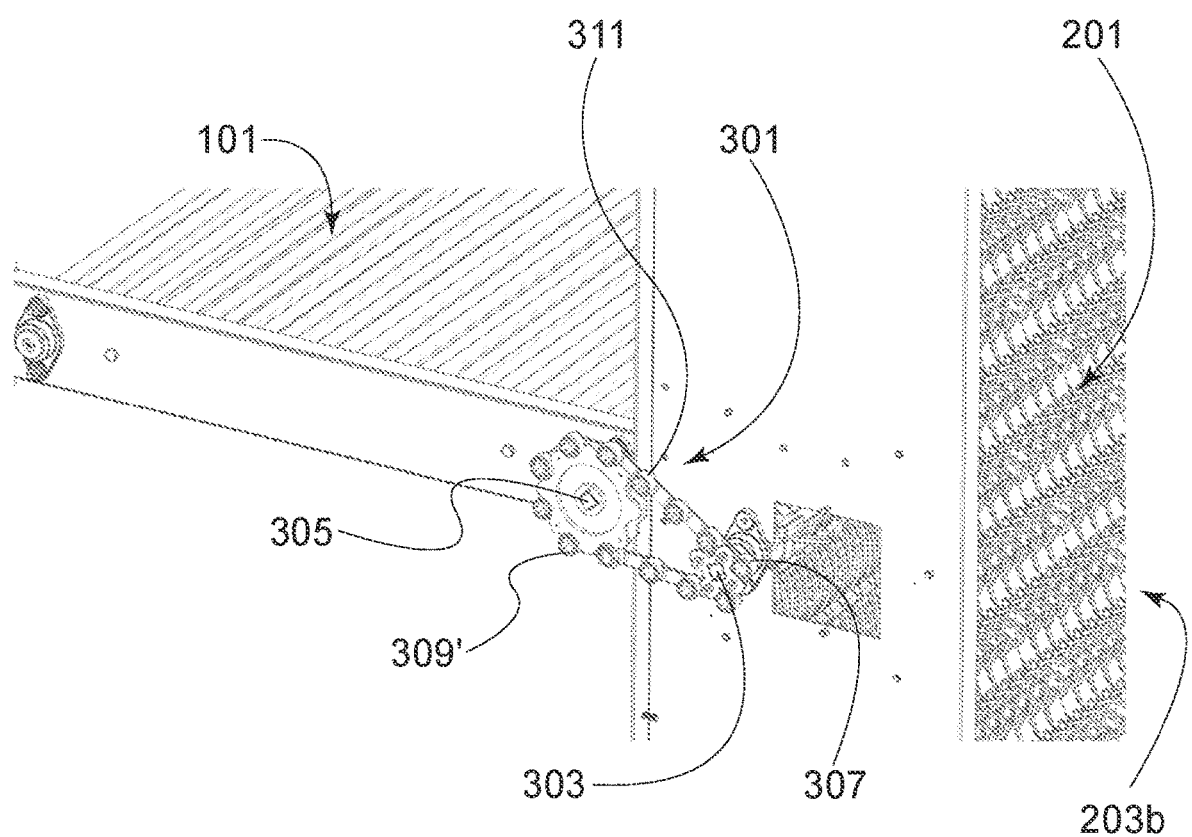
FIG. 4 shows in enlarged scale the motion transmission assembly of the conveying system of FIG. 1 according to a variant.

Turning now to FIG. 4, a variant of the motion transmission assembly according to the invention is shown.

In FIGS. 2 and 3 the number of teeth of the second pinion 309 is equal to the number of teeth of the first pinion 307 and, consequently, the conveying system is configured so that eggs are transferred from the conveyor belt 103 of the first conveying device 101 to all the seat 205 consecutively arranged on the second conveying device 201.

On the other hand, in the variant of FIG. 4, the motion transmission assembly 301 comprises a second pinion 309' which has a number of teeth equal to twice the number of teeth of the first pinion 307, i.e. eight teeth.

Consequently, the first conveying device will advance more slowly, specifically at half the speed, than in the case of FIGS. 2 and 3.

As a result, eggs are transferred from the conveyor belt 103 of the first conveying device 101 to alternate seats 205 of the second conveying device 201.

It will be evident to the person skilled in the art that the number of teeth of the second pinion 309' can be equal to any multiple of the number of teeth of the first pinion 307, the frequency with which eggs are transferred from the conveyor belts of the first conveying device to the seats of the second conveying device decreasing as the number of teeth of the second pinion 309' increases with respect to the number of teeth of the first pinion 307.

It will also be evident to the person skilled in the art that the invention is not limited to the embodiment described above and numerous modifications and variations are possible within the scope defined by the appended claims.

The invention claimed is:

1. A conveying system for shock-sensitive items, comprising at least a first conveying device, having a substantially horizontal orientation, and a second conveying device, having at least a first, upwardly moving section, which has a substantially vertical orientation and along which the items are advanced in an upward direction, wherein the second conveying device comprises a plurality of seats to receive the items, wherein the second conveying device is arranged so that the upwardly moving section faces an end of the first conveying device and is aligned thereto, whereby the items are transferred from the first conveying device to the seats of the second conveying device, wherein the conveying system is provided with a motion transmission assembly which is arranged between the first and the second conveying devices to transmit motion from one to the other of the conveying devices, the motion transmission assembly comprising:
    a first, driving shaft, which receives motion from the one of the conveying devices;
    a second, driven shaft, mounted on the other one of the conveying devices;
    a first pinion, mounted on the first, driving shaft;
    a second pinion, mounted on the second, driven shaft;
    a transmission chain, mounted between the first pinion and the second pinion;
    wherein:
    the first, driving shaft has a polygonal cross-section;
    the second, driven shaft has a polygonal cross-section, with the same number of sides as the cross-section of the first, driving shaft;
    the first pinion has a number of teeth equal to the number of sides of the cross-section of the first, driving shaft;
    the second pinion has a number of teeth equal to the number of teeth of the first pinion or to a multiple thereof.

2. The conveying system according to claim 1, wherein the second pinion has a number of teeth equal to the number of teeth of the first pinion.

3. The conveying system according to claim 1, wherein the second pinion has a number of teeth equal to a multiple of the number of teeth of the first pinion.

4. The conveying system according to claim 3, wherein the second pinion has a number of teeth equal to twice the number of teeth of the first pinion.

5. The conveying system according to claim 1, wherein the first, driving shaft receives motion from the second conveying device, and the second, driven shaft is mounted on the first conveying device.

6. The conveying system according to claim 5, wherein the second conveying device advances at constant speed and the motion transmission assembly transforms the motion at constant speed of the second conveying device into an alternately accelerated and decelerated motion of the first conveying device.

7. The conveying system according to claim 5, wherein the motion transmission assembly comprises a cam wheel, mounted on the first, driving shaft and provided with arms which engage the second conveying device for transferring motion from the second conveying device to the first, driving shaft, the number of arms of the cam wheel being equal to the number of sides of the cross-section of the first, driving shaft.

8. The conveying system according to claim 1, wherein the first, driving shaft and the second, driven shaft have a square cross-section, and wherein the first pinion correspondingly has four teeth and the second pinion correspondingly has a number of teeth equal to four or to a multiple of four.

\* \* \* \* \*